(12) United States Patent
Huang et al.

(10) Patent No.: US 9,796,878 B2
(45) Date of Patent: Oct. 24, 2017

(54) COATING COMPOSITION, FILM PREPARED FROM THE COATING COMPOSITION, AND METHOD FOR PREPARING THE COATING COMPOSITION

(71) Applicant: INDUSTRIAL TECHNOLOGY RESEARCH INSTITUTE, Chutung, Hsinchu (TW)

(72) Inventors: Yuan-Chang Huang, Hsinchu (TW); Wei-Cheng Tang, Hsinchu (TW); Shu-Yun Chien, Hsinchu (TW); Yuung-Ching Sheen, Hsinchu (TW); Yih-Her Chang, Baoshan Township, Hsin Chu County (TW); Jer-Young Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 451 days.

(21) Appl. No.: 13/947,925

(22) Filed: Jul. 22, 2013

(65) Prior Publication Data
US 2014/0174321 A1    Jun. 26, 2014

(30) Foreign Application Priority Data
Dec. 26, 2012    (TW) .............................. 101150037 A

(51) Int. Cl.
*D06M 15/643*    (2006.01)
*C09D 183/06*    (2006.01)
(Continued)

(52) U.S. Cl.
CPC .......... *C09D 183/06* (2013.01); *C08K 5/5425* (2013.01); *C08K 5/5435* (2013.01); *C09D 183/08* (2013.01)

(58) Field of Classification Search
CPC .. C08K 5/5425; C08K 5/5435; C09D 183/06; C09D 183/08
(Continued)

(56) References Cited

U.S. PATENT DOCUMENTS 5,102,967 A * 4/1992 Meder .............................. 528/10
6,497,964 B1   12/2002 Matsumura et al.
(Continued)

FOREIGN PATENT DOCUMENTS

CN    102190956 A    9/2011
CN    102731788 A    10/2012
(Continued)

OTHER PUBLICATIONS

Office Action issued on May 8, 2014 for the corresponding Taiwanese Application No. 101150037.
(Continued)

*Primary Examiner* — Alexander Polyansky
(74) *Attorney, Agent, or Firm* — Muncy, Geissler, Olds & Lowe, P.C.

(57) ABSTRACT

The disclosure provides a coating composition, a film made of the coating composition, and method for preparing the coating composition. The coating composition includes a product prepared from cross-linking a (a) polysilsesquioxane with a (b) compound with the structure represented by Formula (I):

Formula (I)

(Continued)

wherein R is independently a hydroxyl group, or $C_{1-8}$ alkoxy group, $R^1$ is a $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group, and $R^2$ is a hydroxyl group, $C_{1-8}$ alkyl group, or $C_{1-8}$ alkoxy group.

16 Claims, 1 Drawing Sheet

(51) Int. Cl.
*C09D 183/08* (2006.01)
*C08K 5/5425* (2006.01)
*C08K 5/5435* (2006.01)

(58) Field of Classification Search
USPC ....... 106/287.11, 287.14; 427/427.4, 428.01, 427/429, 430.1
See application file for complete search history.

(56) References Cited

U.S. PATENT DOCUMENTS

| | | |
|---|---|---|
| 6,696,515 B2 | 2/2004 | Yamaya et al. |
| 6,767,644 B2 | 7/2004 | Aida |
| 2011/0180195 A1 | 7/2011 | Hergenrother et al. |
| 2012/0015191 A1 | 1/2012 | Treadway |
| 2012/0045577 A1 | 2/2012 | Feret et al. |

FOREIGN PATENT DOCUMENTS

| | | |
|---|---|---|
| EP | 1074526 A2 | 7/2001 |
| JP | 2000273395 A | 10/2000 |
| JP | 2006022207 A | 1/2006 |
| JP | 2008150611 A | 7/2008 |
| JP | 2001-310919 A | 5/2010 |
| JP | 2010-116462 A | 5/2010 |
| TW | 200617603 | 6/2006 |
| TW | I39596 | 3/2008 |
| WO | WO-2010113605 A1 | 10/2010 |

OTHER PUBLICATIONS

Baney, Ronald H. et al., Silsesquioxanes, Chem. Rev, 1995, pp. 1409-1430.
Abe, Y. et al., Rapid Communication: Preparation and Properties of Flexible Thin Films by Acid-Catakyzed Hydrolyic Polycondensation of Methyltrimethoxysilane, Journal of Polymer Science: Part A: Polymer Chemistry, 1995, pp. 751-754.
Handke, M. et al., New polysilsesquioxane materials of ladder-like structure, Journal of Molecular Structure, 2009, pp. 254-263.
Gunji, Takahiro et al., Preparation and Properties of Alkoxy(methyl) silsesquioxanes as Coating Agents, Journal of Polymer Science: Part A: Polymer Chemistry, 2004, pp. 3676-3684.
Takamura, Norihiro, Preparation and Properties of Polysilsesquioxanes: Polysilsesquioxanes and Flexible Thin Films by Acid-Catalyzed Controlled Hydrolytic Polycondensation of Methyl- and Vinyltrimethoxysilane, Journal of Polymer Science: Part A: Polymer Chemistry, 1999, pp. 1017-1026.
Chinese Office Action dated Sep. 25, 2015, as issued in corresponding China Patent Application No. 201210585040.8 (16 pages).
Du Janke, et al., "Polyhedral Oligomeric Sibsesquioxane Nanostructurated Materials and Their Applications", China Academic Journal Electronic Publishing House, Jul. 29, 2004, 6 pages.

\* cited by examiner

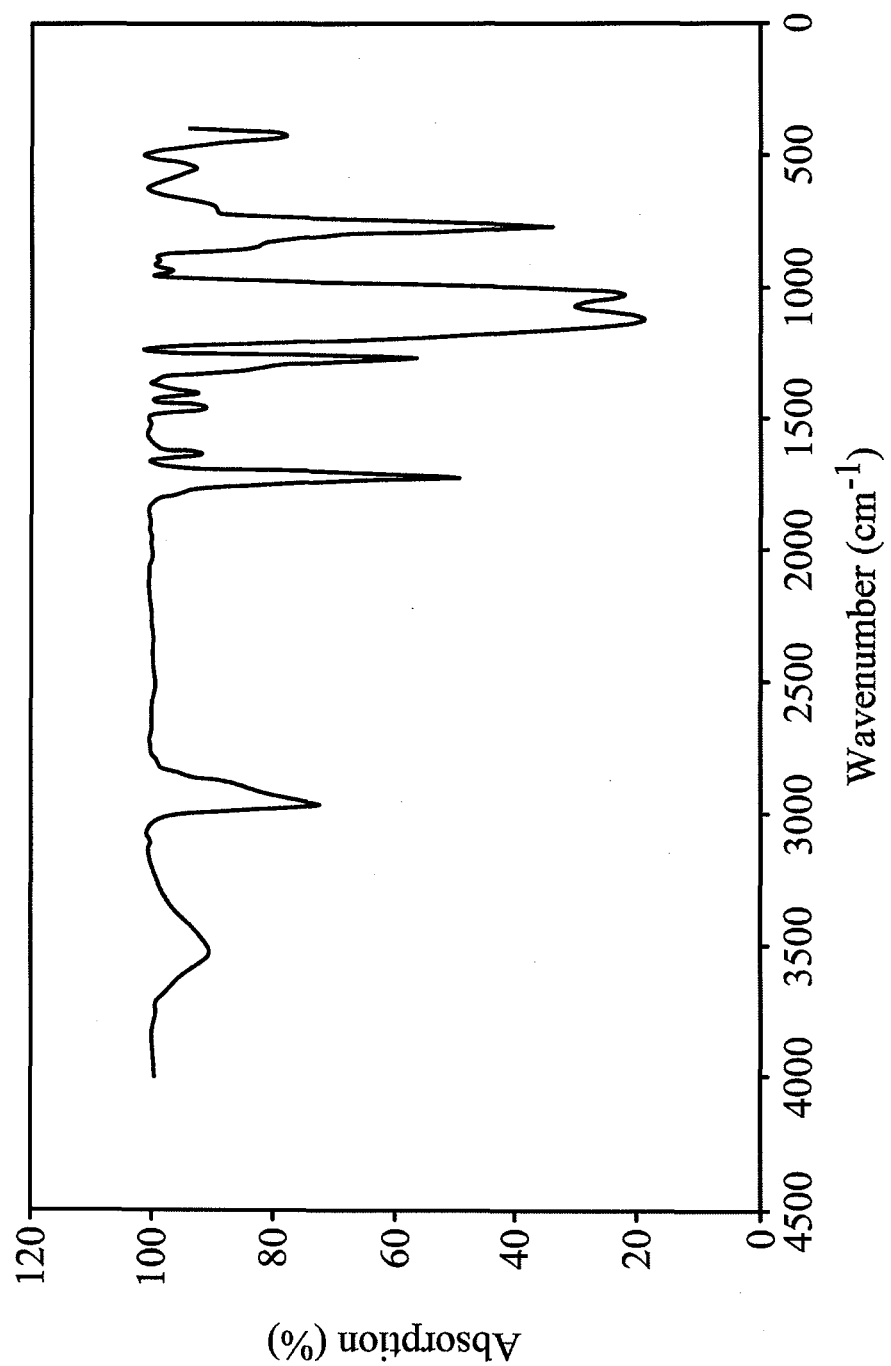

COATING COMPOSITION, FILM PREPARED FROM THE COATING COMPOSITION, AND METHOD FOR PREPARING THE COATING COMPOSITION

CROSS REFERENCE TO RELATED APPLICATIONS

This application is based upon and claims the benefit of priority from the prior Taiwan Patent Application No. 101150037, filed on Dec. 26, 2012, the entire contents of which are incorporated herein by reference.

TECHNICAL FIELD

The technical field relates to a coating composition and, more particularly, to a coating composition for forming a film with high weathering resistance, flexibility, and mechanical strength.

BACKGROUND

Description of the Related Art

Due to their lightweight and flexible properties, organic polymer materials are widely applied in the coating industry and optoelectronic products. However, due to the poor binding potential energy of covalent bonds of the organic polymer materials, the organic polymer materials exhibit insufficient weathering resistance in general.

Meanwhile, although inorganic materials exhibit a sufficient weathering resistance for preventing damage from UV irradiation, inorganic materials have a poor film-forming ability and flexibility, resulting in films which are formed by inorganic materials having a peeling issue.

Therefore, it is necessary to develop a novel coating composition for a film with high film-forming ability, weathering resistance, and flexibility.

SUMMARY

An exemplary embodiment of the disclosure provides a coating composition, including: a product prepared from cross-linking a (a) polysilsesquioxane with a (b) compound with the structure represented by Formula (I) as follows:

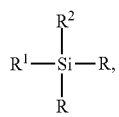

Formula (I)

wherein, R is independently a hydroxyl group, or $C_{1-8}$ alkoxy group, $R^1$ is a $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group, and $R^2$ is a hydroxyl group, $C_{1-8}$ alkyl group, or $C_{1-8}$ alkoxy group.

Another exemplary embodiment of the disclosure provides a method for preparing the aforementioned coating composition, including: reacting the (a) polysilsesquioxane with the (b) compound with the structure represented by the Formula (I) to obtain a product.

According to embodiments of the disclosure, the disclosure provides a film. The film is made from the aforementioned coating composition which is subjected to a coating process.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 1 shows an FT-IR spectrum of the polymer of the coating composition (1) of the Example 1.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The disclosure provides a coating composition, a film prepared from the coating composition, and a method for preparing the coating composition. According to an embodiment of the disclosure, the coating composition includes a product prepared from cross-linking a (a) polysilsesquioxane with a (b) compound with the structure represented by Formula (I) as follows:

Formula (I)

wherein R is independently a hydroxyl group, or $C_{1-8}$ alkoxy group, $R^1$ is a $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group, and $R^2$ is a hydroxyl group, $C_{1-8}$ alkyl group, or $C_{1-8}$ alkoxy group. Particularly, the compound with the structure represented by the Formula (I) is: 2-(3,4-Epoxycyclohexyl)-ethyltrimethoxysilane (2-(3,4-Epoxycyclohexyl)-ethyltrimethoxysilane, 3-Glycidoxypropyltrimethoxysilane(3-Glycidoxypropyltrimethoxysilane, 3-Glycidoxypropyl methyldiethoxysilane(3-Glycidoxypropyl methyldiethoxysilane, 3-Glycidoxypropyl triethoxysilane, 3-Methacryloxypropyl methyldimethoxysilane, 3-Methacryloxypropyl trimethoxysilane, 3-Methacryloxypropyl methyldiethoxysilane, 3-Methacryloxypropyl triethoxysilane, N-2-(Aminoethyl)-3-aminopropylmethyldimethoxysilane, N-2-(Aminoethyl)-3-aminopropyltrimethoxysilane, 3-Aminopropyltrimethoxysilane, 3-Aminopropyltriethoxysilane, N-Phenyl-3-aminopropyltrimethoxysilane, 3-ureidopropyltriethoxysilane, 3-Isocyanatepropyltriethoxysilane, 3-chloropropyltrimethoxysilane, 1H,1H,2H,2H-perfluorooctyltriethoxysilane, heptadecafluoro-1,1,2,2-tetrahydrodecyl) triethoxysilane, 3-mercaptopropyltrimethoxysilane, 3-mercaptopropylmethyldimethoxysilane, bis(triethoxysilylpropyl)tetrasulfide, decyltrimethoxysilane, hexyltriethoxysilane, or 3-acryloxypropyl trimethoxysilane.

Since the product prepared from cross-linking the (a) polysilsesquioxane with the (b) compound with the structure represented by the Formula (I) is a polymer mainly constituted from Si—O bonds, a film prepared from the coating composition having the aforementioned product exhibits high weathering resistance and mechanical strength. Further, since the polymer product has functional groups with high carbon-atom numbers (such as the $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group), the coating composition has high film-forming ability and a film prepared from the coating composition having the aforementioned product exhibits high flexibility.

According to another embodiment of the disclosure, the coating composition can further include a solvent, and the product prepared from cross-linking the (a) polysilsesquioxane with the (b) compound with the structure represented by the Formula (I) is dissolved in the solvent, wherein the solvent can be water, alcohol, ether, ketone, glycol ether, or aromatic solvent. Further, the product prepared from cross-linking the (a) polysilsesquioxane with the (b) compound with the structure represented by the Formula (I) can have a weight average molecular weight of more than 500, such as 500-100,000, 500-50,000, or 500-20,000. Moreover, the char yield of the product prepared from cross-linking the (a) polysilsesquioxane with the (b) compound with the structure represented by the Formula (I) can be measured by a thermal gravimetric analysis (TGA) at 800° C. and is equal to or larger than 50%.

Further, the (a) polysilsesquioxane can be prepared by polymerizing a compound with the structure represented by Formula (II)

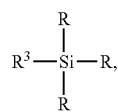

Formula (II)

wherein R is independently hydroxy, or a $C_{1-8}$ alkoxy group, and $R^3$ is halogen, or a $C_{1-8}$ alkyl halide group, $C_{1-8}$ alkoxy group, $C_{1-12}$ alkyl group, or aryl group. Particularly, the compound with the structure represented by the Formula (II) can be 3-chloropropyltrimethoxysilane, methyltrimethoxysilane, methyltriethoxysilane, ethyltriethoxysilane, phenyltriethoxysilane, phenyltrimethoxysilane, tetramethoxysilane, or tetraethoxysilane. The weight ratio between the compound with the structure represented by the Formula (II) and the (b) compound with the structure represented by the Formula (I) is from 0.1 to 10.

According to some embodiments of the disclosure, the coating composition of the disclosure can further include an acid or base (such as hydrochloric acid, nitric acid, sulfuric acid, sodium hydroxide, or sodium bicarbonate) in order to force the coating composition to have a pH value of equal to or less than 6, or equal to or larger than 8. As a result, the curing rate and degree of the film can be improved, thereby enhancing the film-forming ability, flexibility, and weathering resistance of the film.

According to some embodiments of the disclosure, the coating composition of the disclosure can further include a dye or a pigment in order to achieve a desired color-appearance of the film prepared by the coating composition. Particularly, the weight ratio between the dye (or pigment) and the product of the coating composition can be from 0.01 to 10. In other words, the weight ratio between the dye (or pigment) and the total weight of the compounds having structures represented by the Formula (I) and (II) can be from 0.01 to 10.

Further, according to an embodiment of the disclosure, the pigment can be inorganic particles, such as inorganic particles having a refractive index larger of more than 2.3 and a particle size of between 150-500 nm (or 200-400 nm), in order to reduce the light transmittance of the coating composition, resulting in the ability to prepare a white film from the coating composition. For example, the inorganic particles can include titania, zirconia, alumina, ferric oxide, or combinations thereof.

According to another embodiment of the disclosure, the method for preparing the coating composition of the disclosure includes the following step. The (a) polysilsesquioxane is reacted with the (b) compound with the structure represented by the Formula (I) to undergo a cross-linking reaction, to obtain a product.

According to another embodiment of the disclosure, an acid or base can be added during the cross-linking reaction. According to some embodiments of the disclosure, after reacting the (a) polysilsesquioxane with the (b) compound with the structure represented by the Formula (I), a dye or pigment can be mixed with the product.

According to some embodiments of the disclosure, the disclosure also provides a film prepared from the aforementioned coating composition which is subjected to a coating process. The coating process can be a screen-printing, spin-coating, bar-coating, blade coating, roller-coating, dip-coating, spray-coating, or brush-coating process. For example, the film can be applied in the coating industry and serve as paint coated on a surface of metal or concrete. Further, the film can also be applied in optoelectronic products and serve as a substrate or color filter film.

The following examples are intended to illustrate the disclosure more fully without limiting their scope, since numerous modifications and variations will be apparent to those skilled in this art.

Preparation of the Coating Composition

Example 1

5 g of HCl, 38.2 g of DI water, 53 g of tetrahydrofuran (THF), and 51.6 g of methyltrimethoxysilane (MTMS) were added in to a reaction bottle. After stirring and reacting at 55° C. for 3 hrs, a solution including a polysilsesquioxane with a weight average molecular weight (Mw) of 4000 was obtained. Next, the polysilsesquioxane solution was mixed with 51.6 g of 3-methacryloxy propyl trimethoxysilane (MPMS, with a structure of

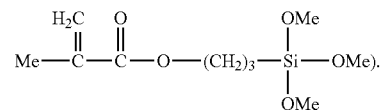

After reacting at 55° C. for 3 hrs, a coating composition (1) was obtained, wherein the product (polymer) of the coating composition (1) had a weight average molecular weight of 9652. FIG. 1 shows an FT-IR spectrum of the product of the coating composition (1), and the FT-IR spectrum shows strong absorption of the carboxyl group (C=O) at 1624 cm$^{-1}$, and strong absorption of the carbon double bond (C=C) at 1721 cm$^{-1}$.

Next, the char yield of the coating composition (1) measured by a thermal gravimetric analysis (TGA) at 800° C. was 66.9%.

Example 2

5 g of HCl, 38.2 g of DI water, 53 g of tetrahydrofuran (THF), and 93.71 g of methyltrimethoxysilane (MTMS) were added in to a reaction bottle. After stirring and reacting at 55° C. for 3 hrs, a solution including a polysilsesquioxane was obtained. Next, the polysilsesquioxane solution was mixed with 9.49 g 3-methacryloxy propyl trimethoxysilane (MPMS, with a structure of

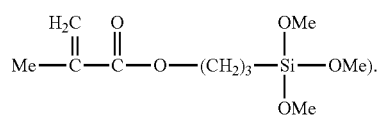

After reacting at 55° C. for 3 hrs, a coating composition (2) was obtained, wherein the product (polymer) of the coating composition (2) had a weight average molecular weight of 6363.

Example 3

5 g of HCl, 38.2 g of DI water, 53 g of tetrahydrofuran (THF), and 51.6 g of methyltrimethoxysilane (MTMS) were added in to a reaction bottle. After stirring and reacting at 55° C. for 3 hrs, a solution including a polysilsesquioxane was obtained. Next, the polysilsesquioxane solution was mixed with 51.6 g of 3-Glycidoxypropyltrimethoxysilane (GPMS, with a structure of

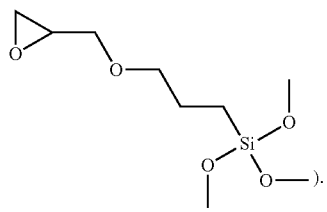

After reacting at 55° C. for 3 hrs, a coating composition (3) was obtained, wherein the product (polymer) of the coating composition (3) had a weight average molecular weight of 14265.

Example 4

5 g of HCl, 38.2 g of DI water, 53 g of tetrahydrofuran (THF), and 82.56 g of methyltrimethoxysilane (MTMS) were added in to a reaction bottle. After stirring and reacting at 55° C. for 3 hrs, a solution including a polysilsesquioxane was obtained. Next, the polysilsesquioxane solution was mixed with 20.64 g of 3-Aminopropyltriethoxysilane (APTS, with a structure of

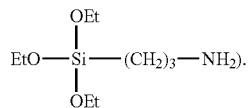

After reacting at 55° C. for 3 hrs, a coating composition (4) was obtained.

Example 5

5 g of HCl, 38.2 g of DI water, 53 g of tetrahydrofuran (THF), and 59.03 g of methyltrimethoxysilane (MTMS) were added in to a reaction bottle. After stirring and reacting at 55° C. for 3 hrs, a solution including a polysilsesquioxane was obtained. Next, the polysilsesquioxane solution was mixed with 44.17 g of 3-methacryloxy propyl trimethoxysilane (MPMS, with a structure of

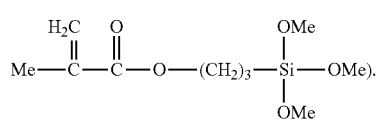

After reacting at 55° C. for 3 hrs, a solution was obtained, wherein the product (polymer) of the solution had a weight average molecular weight of 9000. Next, the solution was mixed with 103.2 g of titania particles (with a particle size of 360 nm), to obtain a coating composition (5).

Example 6

5 g of HCl, 38.2 g of DI water, 53 g of tetrahydrofuran (THF), and 59.03 g of methyltrimethoxysilane (MTMS) were added in to a reaction bottle. After stirring and reacting at 55° C. for 3 hrs, a solution including a polysilsesquioxane was obtained. Next, the polysilsesquioxane solution was mixed with 44.17 g of 3-methacryloxy propyl trimethoxysilane (MPMS, with a structure of

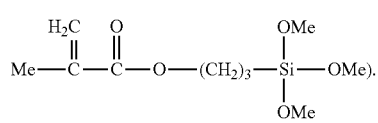

After reacting at 55° C. for 3 hrs, a solution was obtained, wherein the product (polymer) of the solution had a weight average molecular weight of 9000. Next, the solution was mixed with 206.4 g of titania particles (with a particle size of 360 nm), to obtain a coating composition (6).

Comparative Example 1

5 g of HCl, 38.2 g of DI water, 53 g of tetrahydrofuran (THF), and 103.2 g of methyltrimethoxysilane (MTMS) were added in to a reaction bottle. After stirring and reacting at 55° C. for 3 hrs, a coating composition (7) having a polysilsesquioxane was obtained, wherein the polysilsesquioxane had a weight average molecular weight of 4342.

Comparative Example 2

5 g of HCl, 38.2 g of DI water, 53 g of tetrahydrofuran (THF), 51.6 g of methyltrimethoxysilane (MTMS), and 51.6 g of 3-methacryloxy propyl trimethoxysilane (MPMS, with a structure of

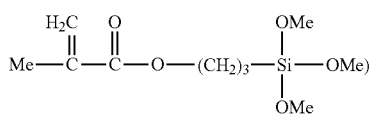

were added in to a reaction bottle. After stirring and reacting at 55° C. for 3 hrs, a coating composition (8) was obtained, wherein the product (polymer) of the coating composition (8) had a weight average molecular weight of 2036.

Comparative Example 3

5 g of HCl, 38.2 g of DI water, 53 g of tetrahydrofuran (THF), and 77.4 g of methyltrimethoxysilane (MTMS) were added in to a reaction bottle. After stirring and reacting at 55° C. for 3 hrs, a solution including a polysilsesquioxane was obtained. Next, the polysilsesquioxane solution was mixed with 25.8 g of tetraethoxysilane (TEOS). After reacting at 55° C. for 3 hrs, a solution having a product (polymer) was obtained, wherein the product (polymer) of the coating composition (9) had a weight average molecular weight of 3435. Next, the solution was mixed with 103.2 g of titania particles (with a particle size of 360 nm), to obtain a coating composition (9).

Comparative Example 4

5 g of HCl, 38.2 g of DI water, 53 g of tetrahydrofuran (THF), and 77.4 g of methyltrimethoxysilane (MTMS) were added in to a reaction bottle. After stirring and reacting at 55° C. for 3 hrs, a solution including a polysilsesquioxane was obtained. Next, the polysilsesquioxane solution was mixed with 25.8 g of tetraethoxysilane (TEOS). After reacting at 55° C. for 3 hrs, a solution having a product (polymer) was obtained, wherein the product (polymer) of the solution had a weight average molecular weight of 3435. Next, the solution was mixed with 206.4 g of titania particles (with a particle size of 360 nm), to obtain a coating composition (10).

Comparative Example 5

5 g of HCl, 38.2 g of DI water, 53 g of tetrahydrofuran (THF), and 63.2 g of methyltrimethoxysilane (MTMS) were added in to a reaction bottle. After stirring and reacting at 55° C. for 3 hrs, a solution including a polysilsesquioxane was obtained. Next, the polysilsesquioxane solution was mixed with 38 g of tetraethoxysilane (TEOS). After reacting at 55° C. for 3 hrs, a solution having a product (polymer) was obtained, wherein the product (polymer) of the solution had a weight average molecular weight of about 3000. Next, the solution was mixed with 103.2 g of titania particles (with a particle size of 360 nm), to obtain a coating composition (11).

Comparative Example 6

5 g of HCl, 38.2 g of DI water, 53 g of tetrahydrofuran (THF), and 63.2 g of methyltrimethoxysilane (MTMS) were added in to a reaction bottle. After stirring and reacting at 55° C. for 3 hrs, a solution including a polysilsesquioxane was obtained. Next, the polysilsesquioxane solution was mixed with 38 g of tetraethoxysilane (TEOS). After reacting at 55° C. for 3 hrs, a solution having a product (polymer) was obtained, wherein the product (polymer) of the solution had a weight average molecular weight of about 3000. Next, the solution was mixed 206.4 g of titania particles (with a particle size of 360 nm), to obtain a coating composition (12).

Preparation of the Films

The coating compositions (1)-(12) of the Examples 1-6 and Comparative Examples 1-6 were coated respectively on a stainless steel plate via a bar-coating process. After drying, films (1)-(12) (with a thickness of 20 μm) were obtained.

The films (1)-(12) were checked to determine whether defects such as unhardened composition portions were observed. Further, the flexibility of the films (1)-(12) were evaluated according to the CNS 10757 standard test, and the results are shown in Table 1, and the pencil hardness of the films (1)-(12) were evaluated according to the ASTM D3363 standard test, and the results are shown in Table 1.

TABLE 1

| | Components | | | | | film-forming ability | flexibility | pencil hardness |
|---|---|---|---|---|---|---|---|---|
| | MTMS | MPMS | GPMS | APTS | TEOS | | | |
| Example 1 | 50% | 50% | | | | good | good | H~2H |
| Example 2 | 90.8% | 9.2% | | | | good | good | H |
| Example 3 | 50% | | 50% | | | good | good | HB |
| Example 4 | 80% | | | 20% | | good | good | 2H |
| Example 5 | 57.2% | 42.8% | | | | good | good | 3H |
| Example 6 | 57.2% | 42.8% | | | | good | good | 3H |
| Comparative Example 1 | 100% | | | | | bad | bad | 2B |
| Comparative Example 2 | 50% | 50% | | | | fail | — | — |
| Comparative Example 3 | 75% | | | | 25% | fair | bad | 4H |
| Comparative Example 4 | 75% | | | | 25% | fair | bad | 4H |
| Comparative Example 5 | 63.2% | | | | 36.8% | fair | bad | 4H |
| Comparative Example 6 | 63.2% | | | | 36.8% | fair | bad | 4H |

In comparison with the film prepared from the coating compositions of the Comparative Example 1, the films prepared from the coating compositions of the Examples 1-4 exhibited high film-forming ability, pencil hardness, and flexibility. Accordingly, due to the functional groups with high carbon-atom numbers (such as the $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group) of the compounds having the structure represented by the Formula (I), the film prepared the coating composition of the disclosure had improved film-forming ability, mechanical strength, and flexibility.

The coating compositions of the Example 1 and Comparative Example 2 employed the same components. In detail, Example 1 discloses polymerizing MTMS in advance before reacting with MPMS. On the other hand, Comparative Example 2 discloses polymerizing MTMS in the presence of MPMS. As shown in Table 1, the film prepared from the coating compositions of the Example 1 had high film-forming ability, hardness, and flexibility. To the contrary, due to the low molecular weight of the polymer of the coating composition of the Comparative Example 2, the coating composition thereof had inferior film-forming ability, and no film was obtained via the coating composition.

In comparison with the films prepared from the coating compositions of the Comparative Examples 3-6, the films prepared from the coating compositions of the Examples 5-6 (including titania particles) had high flexibility and sufficient hardness. To the contrary, the films prepared from the coating compositions of the Comparative Examples 3-6 had poor flexibility.

Next, the weathering resistance of the film (1) prepared from the coating compositions of the Example 1 was evaluated by the ASTM G 154 cycle 2 standard test, wherein the film (1) had a gloss retention of 90.95%.

Accordingly, the film prepared from the coating composition of the disclosure exhibited high weathering resistance, mechanical strength, and flexibility, thereby solving the problems of films prepared from pure organic materials or pure inorganic materials. For example, the film can be applied in the coating industry and serve as paint coated on a surface of metal or concrete. Further, the film can also be applied in optoelectronic products and serve as a substrate or color filter film.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A coating composition, comprising:
   a product prepared from cross-linking a (a) polysilsesquioxane with a (b) compound with the structure represented by Formula (I):

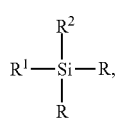

wherein R is independently a hydroxyl group, or $C_{1-8}$ alkoxy group, $R^1$ is a $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group, and $R^2$ is a hydroxyl group, $C_{1-8}$ alkyl group, or $C_{1-8}$ alkoxy group; and an acid such that the coating composition has a pH value equal to or less than 6.

2. The coating composition as claimed in claim 1, wherein the (b) compound with the structure represented by the Formula (I) is selected from the group of 2-(3,4-Epoxycyclohexyl)-ethyltrimethoxysilane (2-(3,4-Epoxycyclohexyl)-ethyltrimethoxysilane, 3-Glycidoxypropyltrimethoxysilane (3-Glycidoxypropyltrimethoxysilane, 3-Glycidoxypropyl methyldiethoxysilane(3-Glycidoxypropyl methyldiethoxysilane, 3-Glycidoxypropyl triethoxysilane, 3-Methacryloxypropyl methyldimethoxysilane, 3-Methacryloxypropyl trimethoxysilane, 3-Methacryloxypropyl methyldiethoxysilane, 3-Methacryloxypropyl triethoxysilane, N-2-(Aminoethyl)-3-aminopropylmethyldimethoxysilane, N-2-(Aminoethyl)-3-aminopropyltrimethoxysilane, 3-Aminopropyltrimethoxysilane, 3-Aminopropyltriethoxysilane, N-Phenyl-3-aminopropyltrimethoxysilane, 3-ureidopropyltriethoxysilane, 3-Isocyanatepropyltriethoxysilane, 3-chloropropyltrimethoxysilane, 1H,1H,2H,2H-perfluorooctyltriethoxysilane, heptadecafluoro-1,1,2,2-tetrahydrodecyl) triethoxysilane, 3-mercaptopropyltrimethoxysilane, 3-mercaptopropylmethyldimethoxysilane, bis(triethoxysilylpropyl)tetrasulfide, decyltrimethoxysilane, hexyltriethoxysilane, or 3-acryloxypropyl trimethoxysilane.

3. The coating composition as claimed in claim 1, wherein the product prepared from cross-linking the (a) polysilsesquioxane and the (b) compound with the structure represented by the Formula (I) has a weight average molecular weight of more than 4,000.

4. The coating composition as claimed in claim 1, wherein the char yield of the product prepared from cross-linking the (a) polysilsesquioxane with the (b) compound with the structure represented by the Formula (I) is equal to or larger than 50%.

5. The coating composition as claimed in claim 1, further comprising:
   a dye or a pigment.

6. A method for preparing the coating composition as claimed in claim 1, comprising:
   reacting a (a) polysilsesquioxane with a (b) compound with the structure represented by Formula (I):

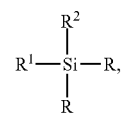

wherein R is independently a hydroxyl group, or $C_{1-8}$ alkoxy group, $R^1$ is a $C_{3-12}$ epoxy group, $C_{3-12}$ acrylate group, $C_{3-12}$ alkylacryloxy group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkyl group, or $C_{3-12}$ alkenyl group, and $R^2$ is a hydroxyl group, $C_{1-8}$ alkyl group, or $C_{1-8}$ alkoxy group, to obtain a product, and wherein an acid is added during the reaction of the (a) polysilsesquioxane and the (b) compound with the structure represented by the Formula (I) such that the coating composition has a pH value equal to or less than 6.

7. The method as claimed in claim 6, wherein the (a) polysilsesquioxane is prepared by polymerizing a compound with the structure represented by Formula (II):

wherein R is independently hydroxy, or a $C_{1-8}$ alkoxy group, and $R^3$ is halogen, or a $C_{1-8}$ alkyl halide group, $C_{1-8}$ alkoxy group, $C_{1-12}$ alkyl group, or aryl group.

8. The method as claimed in claim 7, wherein the compound with the structure represented by the Formula (II) comprises 3-chloropropyltrimethoxysilane, methyltrimethoxysilane, methyltriethoxysilane, ethyltriethoxysilane, phenyltriethoxysilane, phenyltrimethoxysilane, tetramethoxysilane, or tetraethoxysilane.

9. The method as claimed in claim 7, wherein the weight ratio between the compound with the structure represented by the Formula (II) and the (b) compound with the structure represented by the Formula (I) is from 0.1 to 10.

10. The method as claimed in claim 6, wherein the (b) compound with the structure represented by the Formula (I) is selected from the group of 2-(3,4-Epoxycyclohexyl)-ethyltrimethoxysilane, 3-Glycidoxypropyltrimethoxysilane, 3-Glycidoxypropyl methyldiethoxysilane, 3-Glycidoxypropyl triethoxysilane, 3-Methacryloxypropyl methyldimethoxysilane, 3-Methacryloxypropyl trimethoxysilane, 3-Methacryloxypropyl methyldiethoxysilane, 3-Methacryloxypropyl triethoxysilane, N-2-(Aminoethyl)-3-aminopropylmethyldimethoxysilane, N-2-(Aminoethyl)-3-aminopropyltrimethoxysilane, 3-Aminopropyltrimethoxysilane, 3-Aminopropyltriethoxysilane, N-Phenyl-3-aminopropyltrimethoxysilane, 3-ureidopropyltriethoxysilane, 3-Isocyanatepropyltriethoxysilane, 3-chloropropyltrimethoxysilane, 1H,1H,2H,2H-perfluorooctyltriethoxysilane, heptadecafluoro-1,1,2,2-tetrahydrodecyl) triethoxysilane, 3-mercaptopropyltrimethoxysilane, 3-mercaptopropylmethyldimethoxysilane, bis(triethoxysilylpropyl)tetrasulfide, decyltrimethoxysilane, hexyltriethoxysilane, or 3-acryloxypropyl trimethoxysilane.

11. The method as claimed in claim 6, after reacting the (a) polysilsesquioxane with the (b) compound with the structure represented by the Formula (I), further comprising:
mixing the product with a dye or pigment.

12. A film, which is formed by subjecting the coating composition as claimed in claim 1 to a coating process.

13. The film as claimed in claim 12, wherein the coating process is a screen-printing, spin-coating, bar-coating, blade coating, roller-coating, dip-coating, spray-coating, or brush-coating process.

14. The coating composition as claimed in claim 1, wherein the (a) polysilsesquioxane is prepared by polymerizing a compound with the structure represented by the Formula (II):

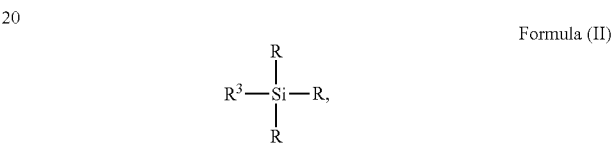

wherein R is independently hydroxy, or a $C_{1-8}$ alkoxy group, and $R^3$ is halogen, or a $C_{1-8}$ alkyl halide group, $C_{1-8}$ alkoxy group, $C_{1-12}$ alkyl group, or aryl group.

15. The coating composition as claimed in claim 14, wherein the weight ratio between the compound with the structure represented by the Formula (II) and the (b) compound with the structure represented by the Formula (I) is from 0.1 to 10.

16. The coating composition as claimed in claim 14, wherein the compound with the structure represented by the Formula (II) comprises 3-chloropropyltrimethoxysilane, methyltrimethoxysilane, methyltriethoxysilane, ethyltriethoxysilane, phenyltriethoxysilane, phenyltrimethoxysilane, tetramethoxysilane, or tetraethoxysilane.

* * * * *